(12) United States Patent
Marseille et al.

(10) Patent No.: US 10,203,841 B2
(45) Date of Patent: Feb. 12, 2019

(54) IN PLACE CREATION OF OBJECTS

(75) Inventors: Tina Marseille, Heidelberg (DE); Holger Deist, Neckarbischofsheim (DE); Carsten Schmitt, Speyer (DE); Marcel Schreier, Lauffen (DE)

(73) Assignee: SAP SE, Walldorf (DE)

( * ) Notice: Subject to any disclaimer, the term of this patent is extended or adjusted under 35 U.S.C. 154(b) by 543 days.

(21) Appl. No.: 13/458,619

(22) Filed: Apr. 27, 2012

(65) Prior Publication Data

US 2013/0290883 A1 Oct. 31, 2013

(51) Int. Cl.
*G06F 3/048* (2013.01)
*G06F 17/24* (2006.01)
*G06F 3/0482* (2013.01)

(52) U.S. Cl.
CPC ............ *G06F 3/0482* (2013.01); *G06F 3/048* (2013.01); *G06F 17/243* (2013.01)

(58) Field of Classification Search
CPC ....... G06F 3/048; G06F 17/243; G06F 3/0482
USPC ........................................................ 715/763
See application file for complete search history.

(56) References Cited

U.S. PATENT DOCUMENTS

| | | | | |
|---|---|---|---|---|
| 5,450,538 A | * | 9/1995 | Glaser ................... | G06F 3/0481 715/236 |
| 6,084,585 A | * | 7/2000 | Kraft ................... | G06F 3/04895 715/205 |
| 6,137,488 A | * | 10/2000 | Kraft ................... | G06F 3/04895 707/999.004 |
| 6,286,028 B1 | * | 9/2001 | Cohen et al. ................. | 709/202 |
| 6,407,761 B1 | * | 6/2002 | Ching et al. ................... | 715/835 |
| 6,970,844 B1 | * | 11/2005 | Bierenbaum ................... | 705/39 |
| 7,194,426 B1 | * | 3/2007 | Box ............................ | 705/26.1 |
| 7,406,657 B1 | * | 7/2008 | Callaghan .............. | G06Q 10/10 715/203 |
| 7,461,077 B1 | * | 12/2008 | Greenwood .......... | G06F 3/0482 |
| 8,082,539 B1 | * | 12/2011 | Schelkogonov et al. ..... | 717/106 |
| 8,621,382 B1 | * | 12/2013 | Young .................. | G06Q 10/107 715/700 |
| 2002/0122202 A1 | * | 9/2002 | Nagashima .......... | G06F 17/243 358/1.15 |
| 2002/0184233 A1 | * | 12/2002 | Schneider .................. | 707/104.1 |
| 2004/0111428 A1 | * | 6/2004 | Rajan et al. .................. | 707/102 |
| 2004/0119752 A1 | * | 6/2004 | Beringer et al. .............. | 345/779 |
| 2004/0249785 A1 | * | 12/2004 | Gauweiler ........................ | 707/1 |
| 2006/0233105 A1 | * | 10/2006 | Rapp ............................ | 370/230 |
| 2007/0044041 A1 | * | 2/2007 | Beynon ................. | G06F 17/243 715/862 |
| 2007/0077665 A1 | * | 4/2007 | Bump et al. .................... | 438/14 |
| 2008/0065974 A1 | * | 3/2008 | Campbell ..................... | 715/200 |
| 2008/0133960 A1 | * | 6/2008 | Wong ................ | G06F 17/30427 714/2 |
| 2008/0140458 A1 | * | 6/2008 | Moore .............................. | 705/5 |

(Continued)

OTHER PUBLICATIONS

Microsoft Corporation, "Computer Dictionary", 2002, Fifth Edition, p. 425.*

*Primary Examiner* — Nicholas Klicos
(74) *Attorney, Agent, or Firm* — Buckley, Maschoff & Talwalkar LLC

(57) ABSTRACT

A system and method to receive, via a graphical user interface layout, a request to create a data element; and present within the graphical user interface layout, in response to receiving the request, an expanded user interface element including user interface input fields to specify at least one attribute of the data element.

16 Claims, 8 Drawing Sheets

(56) References Cited

U.S. PATENT DOCUMENTS

| | | | |
|---|---|---|---|
| 2008/0295014 A1* | 11/2008 | Hennum | G06F 3/04842 |
| | | | 715/771 |
| 2009/0018844 A1* | 1/2009 | Baker | 705/1 |
| 2009/0125830 A1* | 5/2009 | Marcek | G06F 9/4443 |
| | | | 715/771 |
| 2009/0210264 A1* | 8/2009 | Anderson et al. | 705/5 |
| 2010/0057776 A1* | 3/2010 | Baeuerle | G06Q 30/06 |
| | | | 707/E17.001 |
| 2010/0064252 A1* | 3/2010 | Kramer | G06F 3/0481 |
| | | | 715/810 |
| 2010/0299622 A1* | 11/2010 | Sako | G06F 19/321 |
| | | | 715/764 |
| 2010/0333014 A1* | 12/2010 | Fritzley | G06F 3/0485 |
| | | | 715/784 |
| 2011/0214067 A1* | 9/2011 | Tanaka | G06F 17/243 |
| | | | 715/745 |
| 2011/0238437 A1* | 9/2011 | Zhou | G06F 19/3487 |
| | | | 705/2 |
| 2011/0289439 A1* | 11/2011 | Jugel | G06F 8/34 |
| | | | 715/771 |
| 2012/0016894 A1* | 1/2012 | Brunswig et al. | 707/758 |
| 2012/0016910 A1* | 1/2012 | Schlarb et al. | 707/803 |
| 2012/0144285 A1* | 6/2012 | Bach | G06F 17/243 |
| | | | 715/221 |
| 2012/0159336 A1* | 6/2012 | Norwood | G06F 3/0482 |
| | | | 715/733 |
| 2012/0284105 A1* | 11/2012 | Li | 705/14.23 |
| 2013/0024226 A1* | 1/2013 | Bourke | 705/7.12 |
| 2013/0086483 A1* | 4/2013 | Vainer et al. | 715/751 |
| 2013/0159903 A1* | 6/2013 | Yu et al. | 715/765 |
| 2013/0246941 A1* | 9/2013 | Madhava | G06Q 10/10 |
| | | | 715/753 |

* cited by examiner

200

```
┌─────────────────────────────────────────────────────┐
│  RECEIVE, VIA A GRAPHICAL USER INTERFACE LAYOUT, A  │
│         REQUEST TO CREATE A DATA ELEMENT            │
│                                                 205 │
└─────────────────────────────────────────────────────┘
                           │
                           ▼
┌─────────────────────────────────────────────────────┐
│       PRESENT WITHIN THE GRAPHICAL USER INTERFACE   │
│      LAYOUT, IN RESPONSE TO RECEIVING THE REQUEST,  │
│         AN EXPANDED USER INTERFACE ELEMENT, THE     │
│       EXPANDED USER INTERFACE ELEMENT INCLUDING     │
│     USER INTERFACE INPUT FIELDS TO SPECIFY AT LEAST │
│            ONE ATTRIBUTE OF THE DATA ELEMENT        │
│                                                 210 │
└─────────────────────────────────────────────────────┘
```

*FIG. 2*

| Travel Application | USERNAME | Settings | Help | ⏻ |

HELP

Create Travel Request

Date * [📅] to [📅]    Cost Estimate [        ] USD
Purpose * [      ▼]    Cost assignment * [Cost Center ▼] [Dept. Sales EMEA ▼]
Country * [      ▼]    Cost assignment * James Eagen Lane
Destination (City) *    Comments
State *

More Details    Cancel  Submit

Show: [Last 3 Months ▼]                                                                     Refresh Booking Feb 14, 2011–Feb 18, 2011                          2,022.07 USD Filed           Expense Report: Not Submitted
Workshop in Palo Alto
Palo Alto, USA Feb 01, 2011–Feb 08, 2011                          100.00 USD Estimated         Travel Request: Approved
Customer Visit Munich
Munich, Germany Jan 22, 2011–Jan 27, 2011                          2,760.00 USD Estimated       Travel Plan: Reserved
Workshop in Cologne
Cologne, Germany Jan 17, 2011–Jan 21, 2011                          4,051.55 USD Filed           Expense Report: Not Submitted
Workshop in Athens
Athens, Greece Jan 12, 2011–Jan 16, 2011                          2,700.00 Rejected            Expense Report: Rejected
Roundtrip to Customers                             10,760.64 USD Requested
Athens, Greece | Cologne, Germany | Bangalore, India Jan 11, 2011                                       490.00 USD Paid              Expense Report: Submitted
Dinner with new consultants

IN PLACE CREATION OF OBJECTS

Conventional business computing systems allow users to create and edit data elements. In a graphical user interface environment, a user may typically be directed to or navigated away from a first user interface panel or screen to another user interface panel or screen when initiating a process to create the new data element. Such methods and systems may result in the opening and creation of multiple discrete user interface panels or screens that may prove cumbersome to manage from an end-user perspective.

BRIEF DESCRIPTION OF THE DRAWINGS

FIG. 2 is flow diagram of a process according to some embodiments.

FIG. 4 is a view of an expanded user interface element of a graphical user interface layout according to some embodiments.

FIG. 6 is a view of an expanded user interface element of a graphical user interface layout according to some embodiments.

FIG. 7 is an outward view of a graphical user interface layout according to some embodiments.

FIG. 8 is another view of a graphical user interface layout according to some embodiments.

DETAILED DESCRIPTION

Figure 1:
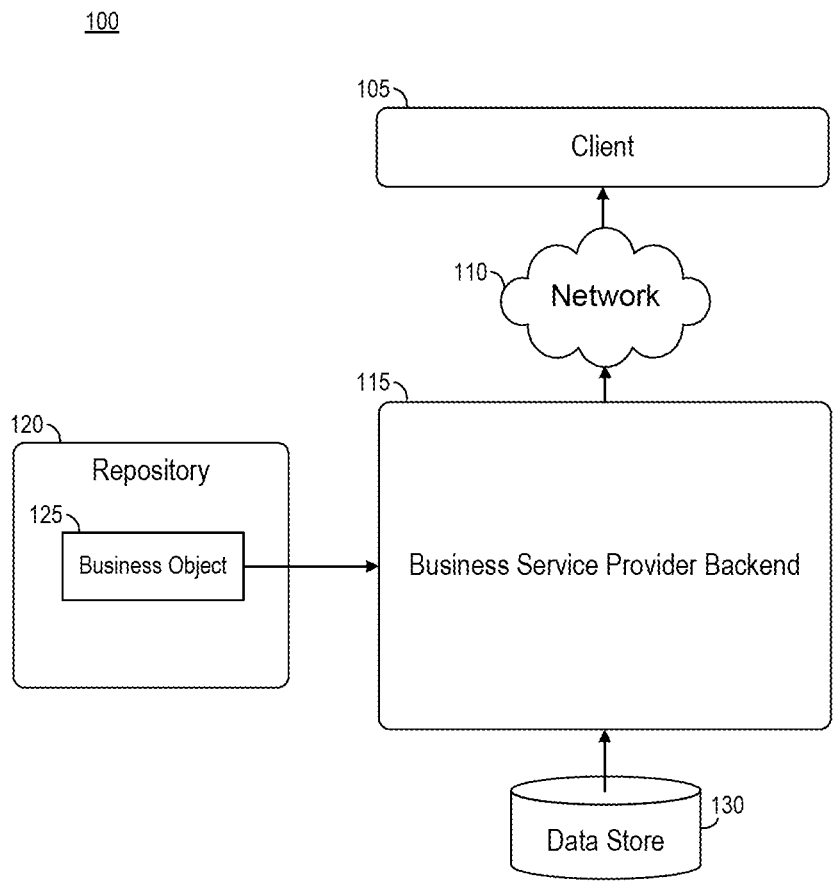
FIG. 1 is a block diagram of a system according to some embodiments.

FIG. 1 is a block diagram of system 100 according to some embodiments herein. FIG. 1 represents a logical architecture for describing processes according to some embodiments, and actual implementations may include more or different components arranged in other manners. Other topologies may be used in conjunction with other embodiments. Moreover, each system described herein may be implemented by any number of computing devices in communication with one another via any number of other public and/or private networks. Two or more of such computing devices of may be located remote from one another and may communicate with one another via any known manner of network(s) and/or a dedicated connection using one or more communication protocols. Each computing device may comprise any number of hardware and/or software elements suitable to provide the functions described herein, as well as any other functions. For example, any computing device used in an implementation of system 100 may include a processor to execute program code such that the computing device operates as described herein.

All systems and processes discussed herein may be embodied in program code stored on one or more computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

System 100 includes business service provider backend 115 for providing business services to users or consumers (not shown) of system 100. The users may interact with system 100 through client device 105 over a network 110. In some aspects, business service provider backend 115 may store user information into and retrieve customer information from physical tables of data store 130. Business service provider backend 115 may provide one or more services and solutions to users thereof. In some aspects, a number of services may be integrated by business service provider backend 115 to provide a comprehensive business solution to users.

Data stored in data store 130 may be received from disparate hardware and software systems, including some that may not be interoperational with one another. The systems herein may include a back-end data environment employed in a business or industrial context. The data may be pushed to data store 130 and/or provided in response to queries received therefrom.

The data of data store 130 may reside in a physical database or stored in-memory (e.g., in Random Access Memory). The data may comprise a relational database, an in-memory database, a multi-dimensional database, an eXtendable Markup Language (XML) document, and/or any other structured data storage system. The physical tables of data store 130 may be distributed among several relational databases, dimensional databases, and/or other data sources. To provide economies of scale, data store 130 may include data of more than one user. Business service provider backend 115 may include mechanisms to ensure that a client accesses only the data that the client is authorized to access. Moreover, the data of data store 130 may be indexed and/or selectively replicated in an index to allow fast retrieval thereof.

The structures of and relationships between the physical database tables may be complex, and business object models (referred to henceforth as "business objects") may be used to shield developers and end-users from these complexities. System 100 implements metadata models to support different business solutions. Metadata models may include generic models of a business object, a floorplan (i.e., a user interface layout), user interface text, a process component, and a message type, among others. A business object, for example, is a software model data structure representing real-world items used during the transaction of business and having associated attributes. An instance of a business object metadata model (i.e., a particular data set according to the business object metadata model) may comprise, for example, a TravelRequest object model or an ExpenseReport object model. Instances of these object models, in turn, represent specific data (e.g., TravelRequest 5985, TravelExpense 715) and provide a mapping to the underlying tables storing the specific data associated with a particular travel request and expense report.

Repository 120 includes metadata of various metadata models (e.g., business objects). These metadata models include metaobjects and instances of the metaobjects, referred to herein as object models or objects. The metaobjects and object models are defined by metadata of repository 120.

As mentioned above, the metaobjects may include generic models of a floorplan (also referred to herein as a graphical user interface layout), a business object, a user interface text, a process component, and a message type, but embodiments are not limited thereto. The metaobjects and object models may be embodied in any type of data structure, including but not limited to eXtensible Markup Language files. As in the conventional storage of object instance data, the metadata defining the specific metaobjects and object models may be stored in database tables and/or any other suitable format.

Business object 125 is an object model, or class. The metadata of business object 125 may therefore provide information regarding the structure and attributes of the data of instances of business object 125. Accordingly, backend 110 uses the metadata to access corresponding data of data store 130.

Some embodiments herein are associated with systems and methods for creating new objects at a user's request, in place of a floorplan. FIG. 2 is an example of a flow diagram of a process 200, according to some embodiments herein. At operation 205, a request is received to create a data element. In some embodiments herein, the data element may be an instance of a business object as described above. The request is received from a user via a graphical user interface layout or floorplan. In some aspects, the user need not be aware of the underlying data structure corresponding to the data element requested to be created, its storage location, or the attributes and characteristics of the data element. For example, the floorplan may present a list of one or more data elements (e.g., business objects) that the user may select from for the purpose of requesting the creation of an instance of the data element, in the course of performing business related functions. The list of data elements may represent a report, document (structured and unstructured data), and other objects, each named according to conventions familiar to the user.

At operation 210, in response to receiving the request of operation 205, an expanded user interface element may be presented to the user within and in the context of the floorplan of operation 205. The expanded user interface element may, in some embodiments, include user interface input fields for the data element being created per the request of operation 205. In some aspects, the user interface input fields may facilitate the entry and specification of a value(s) for at least one attribute of the data element being created.

In some embodiments, the expanded user interface element is presented as and forms an integral part of the floorplan. For example, the expanded user interface element may be presented within the floorplan such that it does not obscure or otherwise cover or hinder viewing of other user interface elements of the floorplan. In some aspects, the expanded user interface element may be presented in a fixed relationship to other user interface elements of the floorplan. This presentation of the expanded user interface element in fixed relationship within the floorplan may, in some regards, convey the aspect(s) of the expanded user interface element being an integral part of the floorplan. In this manner, the data element may be created in place, in the floorplan, without a user being directed, re-directed, or otherwise navigated to a different floorplan or context.

In some aspects herein, the user interface input fields provided in the expanded user interface element to facilitate the entry and specification of values for at least one attribute of the data element being created may be limited to the minimum attributes required to create the data element. For example, the user interface input fields presented to a user in the expanded user interface element may include no more than those input fields corresponding to the attributes absolutely necessary or sufficient to create the data element. The number and type of user interface input fields required, as a minimum, to create the data element such that it is usable for its intended purpose (e.g., reporting, calculating, analyzing, etc.) may vary depending on the specific data element and any rules, limitations, and constraints associated with the data element.

Figure 3:
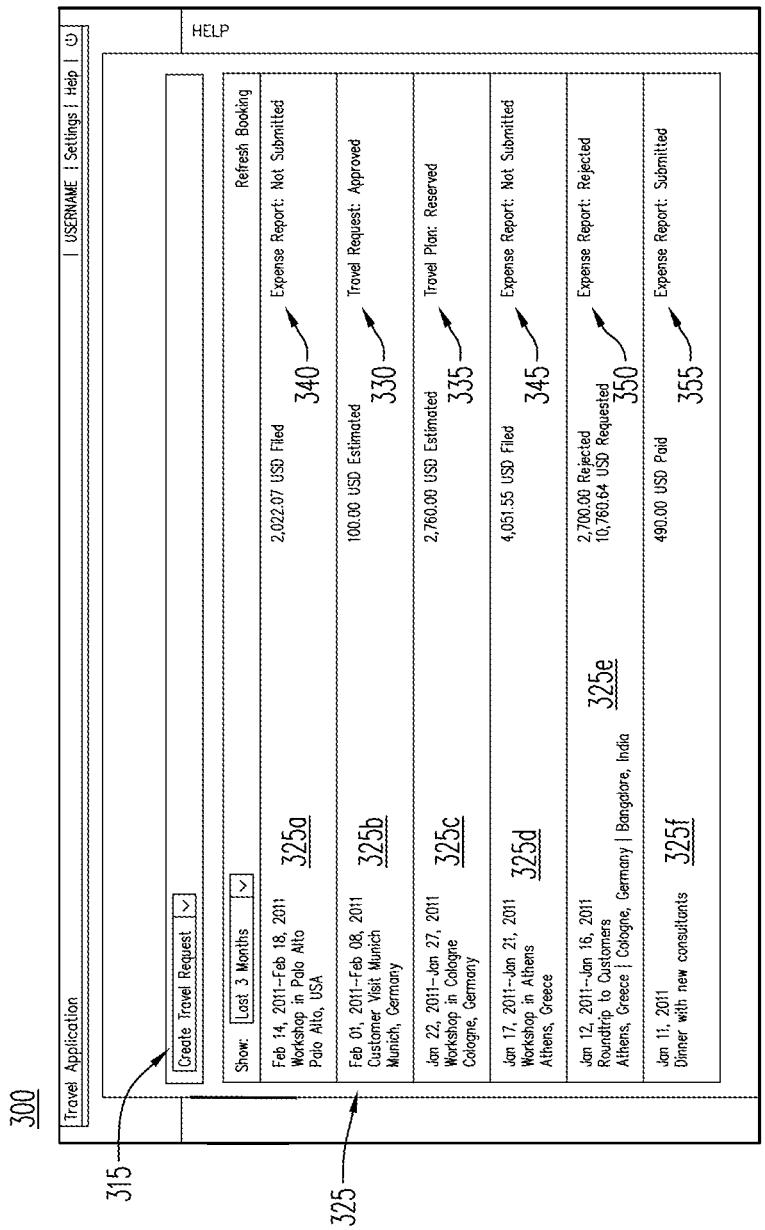
FIG. 3 is an outward view of a graphical user interface layout according to some embodiments.

FIG. 3 is an outward view of a user interface layout or floorplan 300, according to some embodiments. User interface layout 300 may be presented on a display of a client device in response to execution of a program, application, "app", or service interface by a processor of a client device (e.g., client 105 of FIG. 1). Alternatively, user interface layout 300 may be a Web page displayed by a Web browser application executed by the processor. The example of FIG. 1 may relate to a travel management service.

Floorplan 300 may be a home page for a user in the present example. Floorplan 300 is shown as including a user interface element 315 that may be selected by a user to, for example, "create a travel request" as illustrated in FIG. 3. Floorplan 300 further includes a work list 325 of previously created objects associated with the user.

The previously created objects in work list 325 may relate to different types of objects, reflecting different business related processes. For example, objects 325a, 325d, 325e, and 325f are each an Expense Report, as indicated at 340, 345, 350, and 355, respectively. Object 325b is a Travel Request as indicated at 330 and object 325c is a Travel Plan as shown at 335. As further illustrated in FIG. 3, the objects 325 include details of the current life cycle stage represented by the objects. For example, the object 325a expense report has not been submitted, while the 325e expense report has been rejected and the 325f expense report has been submitted (not yet approved or rejected).

A user may initiate the creation of a travel request by selecting or activating user interface element 315. User interface element may be selected or invoked using any technique for selecting user interface elements. Upon receiving an indication of the request to create the travel request, an expanded user interface element 405 is presented within floorplan 300 as illustrated in FIG. 4. The example screen 400 depicted in FIG. 4 includes the floorplan 300 of FIG. 3 with the expanded user interface element 405 shown within the floorplan. As illustrated, the expanded user interface element 405 does not obscure or otherwise cover or hide any of the other user interface elements of floorplan 300. For example, the work list including the existing objects 325 are still visible within floorplan 300 of screen 400.

As illustrated in FIG. 4, expanded user interface element 405 includes a number of user input fields to accept values for attributes of the data element (e.g., the travel request) being created. In some embodiments, the extent of the user interface elements presented in the expanded user interface element 405 may be limited to those user input fields needed or required, at a minimum, to create the travel request of the present example. The example object being created in FIG. 4 includes user input fields for a date 410; a purpose of the travel request at 420; a country 425, city 430, and state 435 for the destination of the travel request; a cost assignment 440 and a comments entry area 445 for the travel request. In the example of FIG. 4, the user interface fields required to successfully create a valid travel request are indicated by an asterisk (*). However, as discussed above some embodiments herein may limit the presented user input fields to those absolutely needed or required, at a minimum, to create the travel request of the present example. User input selection buttons 450 and 455 provide a mechanism to cancel the object creation operation and a mechanism to enter (i.e., commit) the object creation process.

Upon the selection of either the cancel 450 button or the submit button 455, the expanded user interface element 405 may be closed. In the instance the requisite data is input into the user interface input fields of the expanded user interface element 405 and the submit button is selected, then the travel request is created by the processor(s) of the systems and devices carrying out the processes herein and the expanded user interface element 405 is closed. The newly created object is presented in the work list in response to being created. In some aspects, the created travel request, including an associated life cycle status, is automatically included in the work list at 325 when the object is created. In this manner, the travel request is created in place, within the floorplan of the 300. In the instance cancel button 450 is selected, then the object creation operation is aborted and expanded user interface element 405 is closed.

Figure 5:
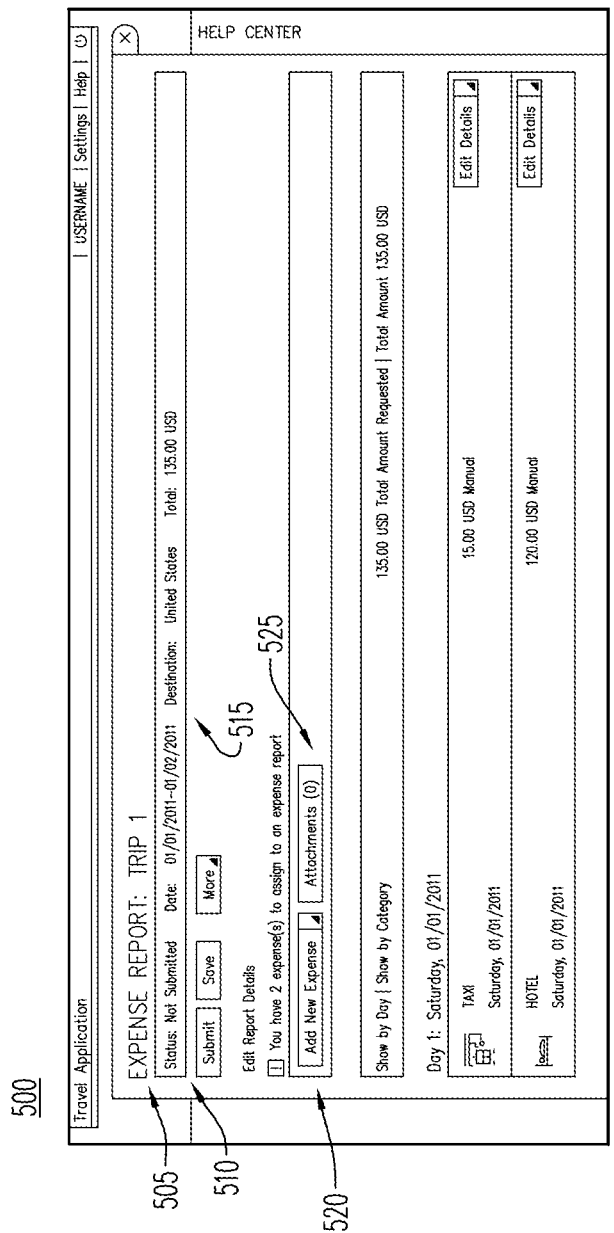
FIG. 5 is a view of a graphical user interface layout source according to some embodiments.

FIG. 5 includes an overview of a user interface layout or floorplan 500 depicting aspects of creating an expense report in accordance with embodiments herein. The expense report 505 of FIG. 5 may be created since an expense report has not yet been submitted according to the status indication at 510. The expense report may be created to substantiate the expenses associated with a trip involving travel on the dates and destination detailed at 515. The request to create the expense report may be indicated by a user selecting user interface element 520. Furthermore, attachments or objects representative of attachments (e.g., travel receipts) may be associated with the expense report being created by selecting user interface button 525.

Figures 6, 7:
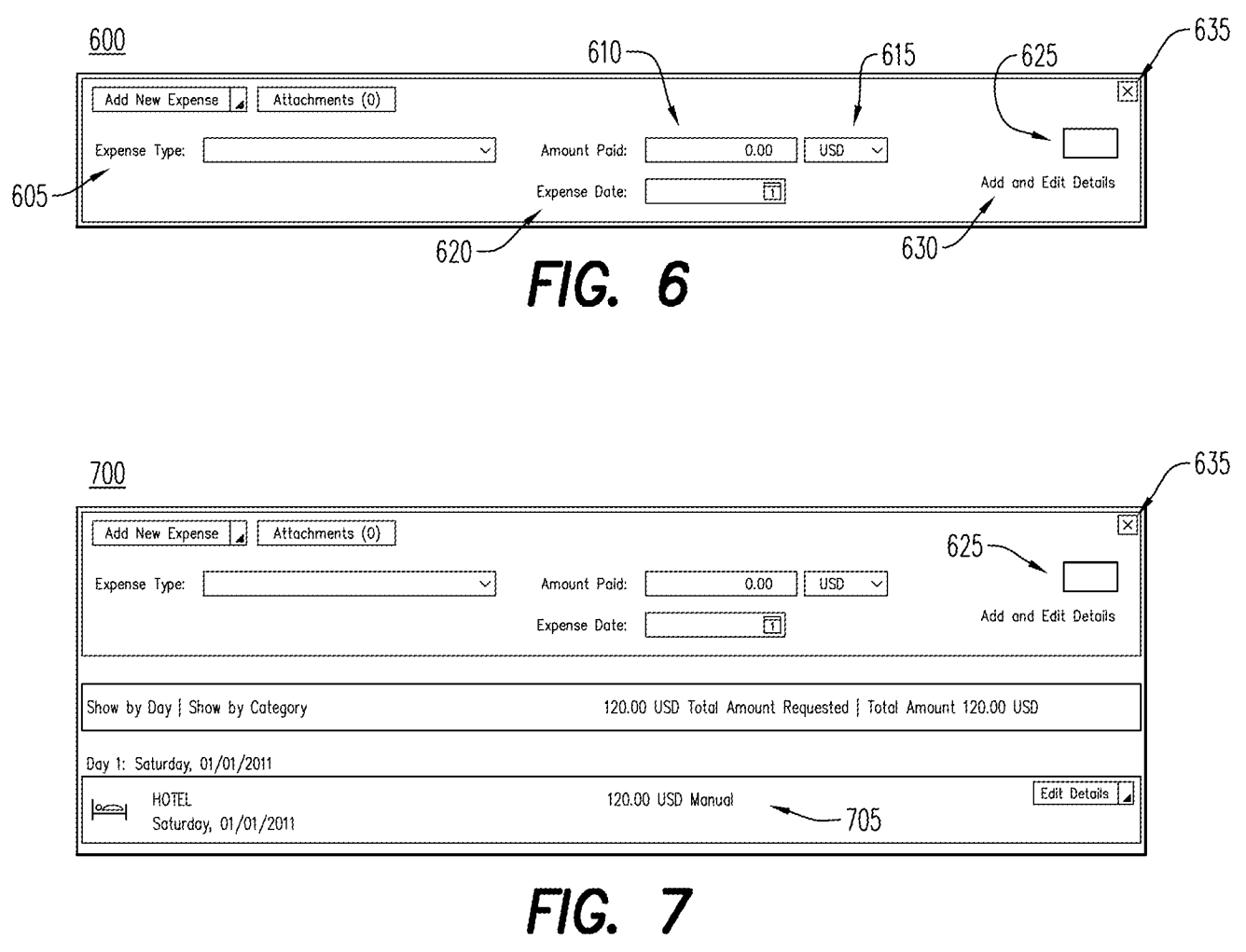

FIG. 6 provides an illustrative depiction of an expanded user interface element 600 that may be presented in the floorplan 500 in response to receiving a request to create a new expense report object. As shown, user input fields are provided for the input of values for attributes for the expense report being created. The user interface fields include fields for an expense type 605, an amount paid 610, a denomination 615 for the amount paid, a expense date for the incurred expense 620, as well as button 625 for adding and button 630 adding and editing the details of the expense report being created.

In the instance the add button 625 is selected in expanded user interface element 600 of FIG. 6, the expense report may be created and listed in a listing of expense reports associated with the user as illustrated in screen view 700 of FIG. 7. As depicted in FIG. 7, the expense report data element 705 created in FIG. 6 is added to the list of expense reports in FIG. 7. In both FIGS. 6 and 7, the expanded user interface element remains open after the "add" button is selected for the expense report being created. The "x" button 635 may be selected to visually hide the expanded user interface element.

Figure 8:
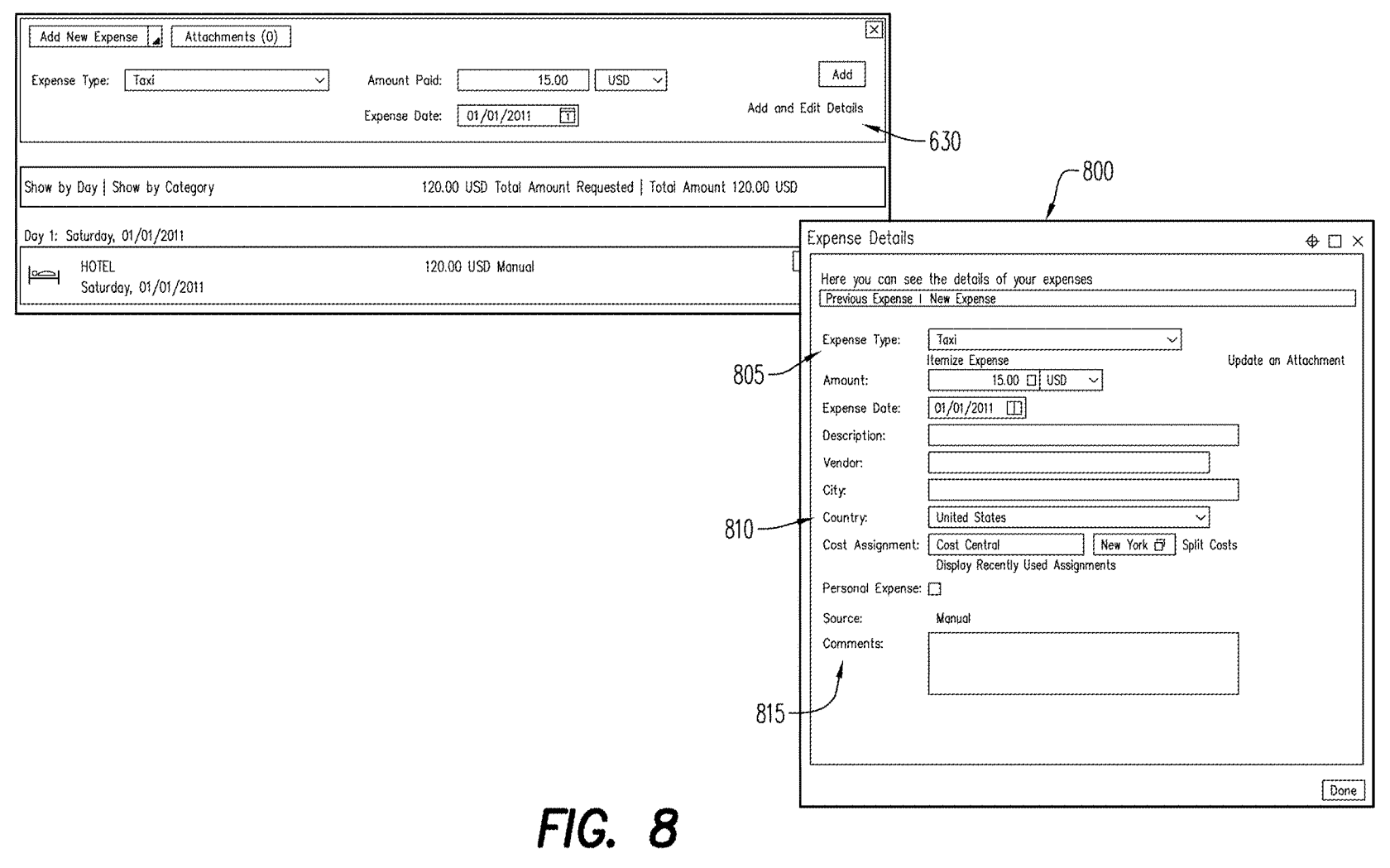

FIG. 8 includes a further illustration of the expanded user interface element 600 of FIG. 6. In the instance the add and edit button 630 is selected in the expanded user interface element 600, the expense report may be created as illustrated in FIG. 8. However, a further expanded user interface element 800 is presented that includes the user interface fields with their specified values as entered in FIG. 6 (e.g., fields 805) and additional user interface input fields (e.g., fields 810 and 815) for the entry of additional details related to the created expense report. In some embodiments, the user input fields in the expanded user interface element 600 include the input fields required to create the expense report, and the user input fields in the further expanded user interface element 800 include other, additional input fields.

In some embodiments, the data entered via the expanded user interface elements herein may be used to continually update the data associated with a date element or object associated with the floorplan to which the expanded user interface elements belongs.

Figure 9:
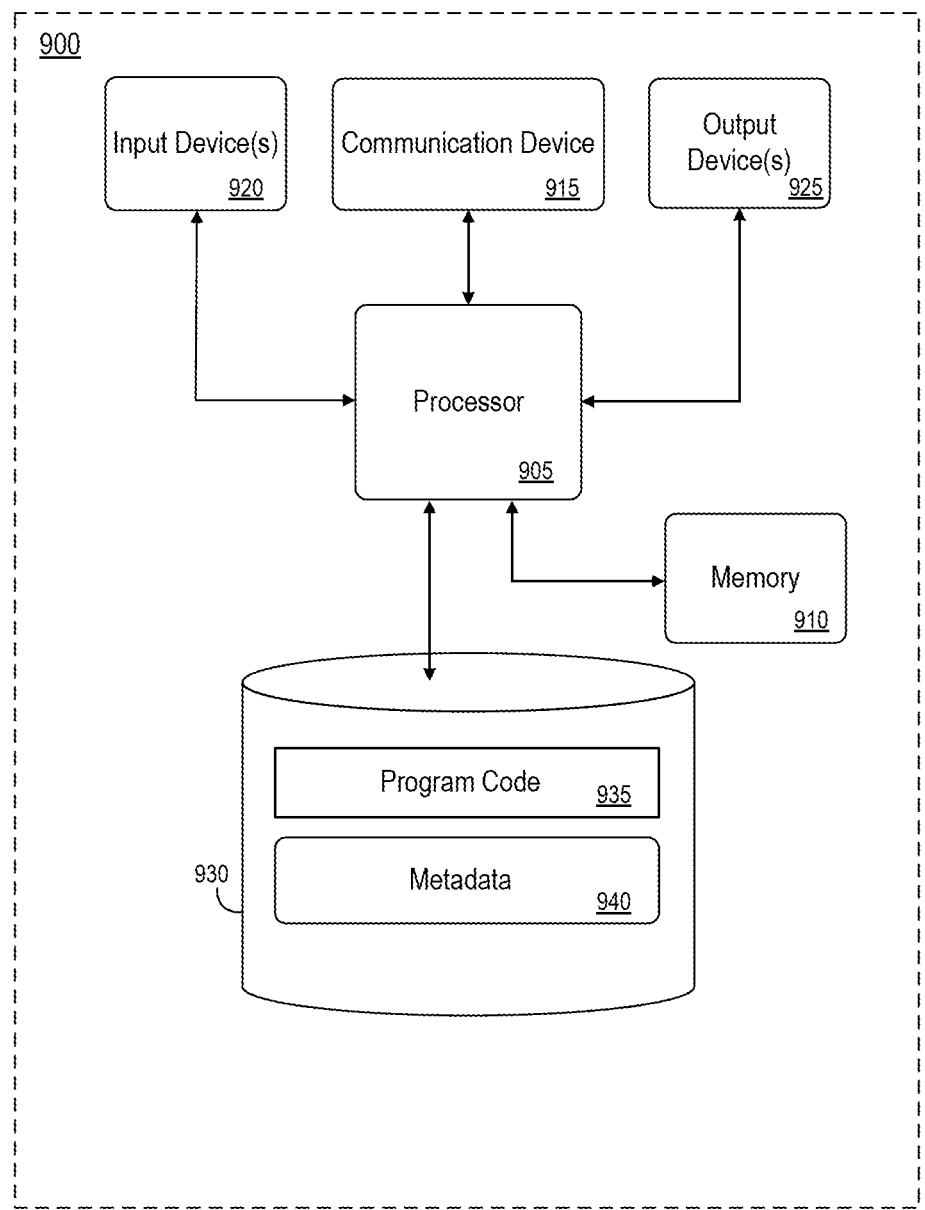
FIG. 9 is a block diagram of a computing device according to some embodiments.

FIG. 9 is a block diagram of apparatus 900 according to some embodiments. Apparatus 900 may comprise a general-purpose computing apparatus and may execute program code to perform any of the functions and processes described herein. Apparatus 900 may comprise an implementation of one or more elements of system 100, including in some embodiments aspects of business service provider 115 and/or of a client device 105 on which the user interfaces and diagrams of the present description are presented. Apparatus 900 may include other unshown elements according to some embodiments.

Apparatus 900 includes processor 905 operatively coupled to communication device 915, data storage device 930, one or more input devices 920, one or more output devices 925 and memory 910. Communication device 915 may facilitate communication with external devices. Input device(s) 920 may comprise, for example, a keyboard, a keypad, a mouse or other pointing device, a microphone, knob or a switch, an infra-red (IR) port, a docking station, and/or a touch screen. Input device(s) 920 may be used, for example, to enter information into apparatus 900. Output device(s) 925 may comprise, for example, a display (e.g., a display screen) a speaker, and/or a printer.

Data storage device 930 may comprise any appropriate persistent storage device, including combinations of magnetic storage devices (e.g., magnetic tape, hard disk drives and flash memory), optical storage devices, Read Only Memory (ROM) devices, etc., while memory 910 may comprise Random Access Memory (RAM).

Program code 935 of data storage device 930 may be executable by processor 905 to provide any of the functions and processes described herein. Embodiments are not limited to execution of these functions by a single apparatus. Metadata 940 may include metadata of reports and data sources as described herein. Data storage device 930 may also store data and other program code for providing additional functionality and/or which are necessary for operation thereof, such as device drivers, operating system files, etc.

Although embodiments have been described with respect to web browser displays, note that embodiments may be associated with other types of user interface displays. For example, a user interface may be associated with a portable device such as a smart phone or a tablet computing device ("tablet"), with a user interface element.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A method implemented by a computing system in response to execution of program code by a processor of the computing system, the method comprising:

receiving, via a graphical user interface layout containing a listing of at least one data element, a request to create an instance of a data element included in the listing of at least one data element, the data element to be created being an instance of a business object metadata model data structure having at least one attribute field described by metadata, wherein the business object metadata model data structure defines the relationship between physical database tables, and the instance represents specific data and provides a mapping to the underlying database table storing the specific data; and presenting, in response to receiving the request, an expanded user interface element that is expanded in the act of creating an instance of the data element in a separate frame within the same graphical user interface layout containing the listing of the at least one data element, and wherein upon submission of the instance of the data element to the database table, the expanded user interface element is closed, wherein the expanded user interface element is in a fixed relationship with other user interface elements in the graphical user interface layout without obscuring the other user interface elements in the graphical user interface layout, the expanded user interface element including user interface input fields to receive values to specify the at least one attribute field of the business object, and wherein the at least one attribute of the business object is described by the metadata and the user interface input fields of the expanded user interface element are limited to a minimum number of attribute fields corresponding to a minimum number of attributes of the business object required to create an instance of the business object.

2. The method of claim 1, wherein the request is received by a user interface element of the graphical user interface layout.

3. The method of claim 2, wherein the user interface element of the graphical user interface layout is replaced in the graphical user interface layout by the expanded user interface element in response to the receiving of the request.

4. The method of claim 1, wherein the data element is one of a series of linked business object metadata models.

5. The method of claim 1, wherein the expanded user interface element including the user interface input fields are presented in a fixed configuration within the graphical user interface layout.

6. The method of claim 1, wherein the data element is created in place in the user interface without a user being directed, re-directed, or otherwise navigated to a different context.

7. The method of claim 1, wherein the submitted instance of the data element is presented in the listing in response to submission.

8. A non-transitory medium storing processor-executable program code, the medium comprising:
program code to receive, via a graphical user interface layout containing a listing of at least one data element, a request to create an instance of a data element included in the listing of at least one data element, the data element to be created being an instance of a business object metadata model data structure having at least one attribute field defined by metadata, wherein the business object metadata model data structure defines the relationship between physical database tables, and the instance presents specific data and provides a mapping to the underlying database table storing the specific data; and
program code to present, in response to receiving the request, an expanded user interface element that is expanded in the act of creating an instance of the data element in a separate frame within the same graphical user interface layout containing the listing of the at least one data element, and wherein upon submission of the instance of the data element to the database table, the expanded user interface element is closed,
wherein the expanded user interface element is in a fixed relationship with other user interface elements in the graphical user interface layout without obscuring the other user interface elements in the graphical user interface layout, the expanded user interface element including user interface input fields receive values to specify the at least one attribute of the business object, and
wherein the at least one attribute of the business object is defined by the metadata and the user interface input fields of the expanded user interface element are limited to a minimum number of attribute fields corresponding to a minimum number of attributes required to create an instance of the business object.

9. The medium of claim 8, wherein the request is received by a user interface element of the graphical user interface layout.

10. The medium of claim 9, wherein the user interface element of the graphical user interface layout is replaced in the graphical user interface layout by the expanded user interface element in response to the receiving of the request.

11. The medium of claim 8, wherein the data element is one of a series of linked business object metadata models.

12. The medium of claim 8, wherein the expanded user interface element including the user interface input fields are presented in a fixed configuration within the graphical user interface layout.

13. A system comprising:
a computing device comprising:
a memory system storing processor-executable program code; and
a processor to execute the processor-executable program code in order to cause the computing device to:
receive, via a graphical user interface layout containing a listing of at least one data element, a request to create an instance of a data element included in the listing of at least one data element, the data element to be created being an instance of a business object metadata model data structure having at least one attribute field described by metadata, wherein the business object metadata model data structure defines the relationship between physical database tables, and the instance represents specific data and provides a mapping to the underlying database table storing the specific data; and
present, in response to receiving the request, an expanded user interface element that is expanded in the act of creating an instance of the data element in a separate frame within the same graphical user interface layout containing the listing of the at least one data element, and wherein upon submission of the instance of the data element to the database table, the expanded user interface element is closed,
wherein the expanded user interface element is in a fixed relationship with other user interface elements in the graphical user interface layout without obscuring the other user interface elements in the graphical user interface layout, the expanded user interface element including user interface input fields to receive values to specify the at least one attribute field of the business object, and
wherein the at least one attribute of the business object is described by the metadata and the user interface input fields of the expanded user interface element are limited to a minimum number of attribute fields corresponding to a minimum number of attributes of the business object required to create an instance of the business object.

14. The system of claim 13, wherein the request is received by a user interface element of the graphical user interface layout.

15. The system of claim 14, wherein the user interface element of the graphical user interface layout is replaced in the graphical user interface layout by the expanded user interface element in response to the receiving of the request.

16. The system of claim 13, wherein the data element is one of a series of linked business object metadata models.

* * * * *